(12) United States Patent
Roderiguez et al.

(10) Patent No.: US 6,284,864 B1
(45) Date of Patent: Sep. 4, 2001

(54) PERMANENT DEEP-DYE POLYESTER

(75) Inventors: Joseph Anthony Roderiguez, Kings Mountain; Rodolfo Agustin Flores, Shelby; Katherine Keever Fulcomer, Gastonia; J. Michael Sutherland, Shelby, all of NC (US)

(73) Assignee: Arteva North America S.A.R.L.

( * ) Notice: Subject to any disclaimer, the term of this patent is extended or adjusted under 35 U.S.C. 154(b) by 0 days.

(21) Appl. No.: 09/679,893

(22) Filed: Oct. 5, 2000

Related U.S. Application Data

(63) Continuation-in-part of application No. 09/583,931, filed on May 31, 2000.

(51) Int. Cl.[7] ................................................. C08G 64/00
(52) U.S. Cl. ............................................ 528/272; 528/271
(58) Field of Search .................................... 528/272, 296, 528/300, 302, 306, 307, 308, 308.6

(56) References Cited

U.S. PATENT DOCUMENTS

| | | |
|---|---|---|
| 5,135,697 | 8/1992 | Roderiguez ........................ 264/210 |
| 5,272,246 | 12/1993 | Roderiguez ........................ 528/272 |

*Primary Examiner*—Terressa M. Boykin
(74) *Attorney, Agent, or Firm*—Gregory N. Clements

(57) ABSTRACT

The invention provides a method of making a copolyester and a resulting copolyester fiber that has increased dyeability and dye retention properties while maintaining good physical properties for textile applications. The fiber may be formed from a mixture comprising terephthalic acid and its ester equivalent in combination with ethylene glycol, and to which is added about 2–4 mole percent of at least two dicarboxylic acids, or their anhydride or ester equivalents excluding terephthalic acid and its ester equivalent, and between about 100 to 700 ppm pentaerytoritol, both being based on the amount of the terephthalic acid and its ester equivalent The dicarboxylic acids and pentaerytliritol may be added before esterification, or after esterification and before polycondensation.

19 Claims, 1 Drawing Sheet

PERMANENT DEEP-DYE POLYESTER

RELATED APPLICATION

This application is a continuation-in-part application of U.S. Ser. No. 09/583,931 filed May 31, 2000 by the same inventive entity.

BACKGROUND OF THE INVENTION

1) Field of the Invention

The present invention relates to the manufacture of copolyester fibers for textile applications, and in particular relates to an enhanced copolyester fiber, which demonstrates improved dye permanence properties and dyeing characteristics. In particular, the present invention relates to employing a small amount of pentaerythritol and a combination of at least two different dicarboxylic acids, or their anhydride or ester equivalents, copolymerized with the raw materials used to make polyethylene terephthalate (PET). The present invention has deeper dye characteristics while maintaining the physical properties compared to the addition of pentaetriitol and adipic acid alone.

2) Prior Art

Copolyester has long been recognized as a desirable material for textile applications. The basic processes for the manufacture of copolyester are relatively well known. Copolyester fibers can be blended with other fibers such as wool or cotton to produce fabrics, which have the enhanced strength and durability of copolyester, while retaining many of the desired qualities of the natural fiber with which the copolyester is blended.

Conventional PET fibers are typically dyed at temperatures of about at least 265° F. so as to achieve uniform dyeing, adequate dye intensity, and acceptable dye permanence. However, the conventional dyeing processes are too harsh for certain heat sensitive natural fibers, causing excess shrinkage or a loss of physical properties of the heat sensitive fibers. When conventional PET fibers are dyed under less harsh conditions, dye uptake by the polyester fiber is lessened as is dye permanence.

However, dye permanence continues to be a problem with conventional PET because it is not as easily dyeable as most natural fibers under the same conditions. Most natural fibers are dyed at low temperatures. Low temperature dyeing of conventional PET will cause the dye to rapidly fade or bleed from the polyester. While various additives have been used in the past to provide a deeper dye uptake (dye intensity) in polyester fibers, such additives have not resulted in dye permanence for PET as required for many end use applications. As a consequence, PET in which dye permanence is an objective must be dyed under conditions of high temperature, high pressure, or both.

It is known in the art that adipic acid can be added to PET to produce a copolyester with improved dyeability. Adding increased amounts of adipic acid during production of the copolyester will increase the dyeability. However, adipic acid increases the shrinkage of the fiber and weakens the strength of the fiber. Consequently, using more than about 4 wt. % (based on the amount of terephthalic acid or its ester equivalent) is not recommended.

It is also known in the art that pentaerythritol at low levels of less than about 700 parts per million (ppm) based on the weight of the terephthalic acid (TA) or dimethyl terephthalate (DMT) can be incorporated into PET for improved dyeability. However, at levels greater than about 700 ppm, the pentaerytliritol often results in decreased strength of the fiber.

U.S. Pat. Nos. 5,135,697 and 5,272,246 to Roderiguez et al disclose the incorporation into PET of 175 to 700 ppm of pentaelythntol and 1.3 to 3.1 wt. percent adipic acid (based on the amount of TA or DMT in the PET). As set forth in Table 1 of these patents, the atmospheric dye rating of PET is defined as being 100. The combination of the addition of pentaerythritol, adipic acid, and PET resulted in a copolymer with an improved atmospheric dye rating of 112. This result is better than using adipic acid and PET, or pentaerythritol and PET. The dyeing temperature was 210° F., which is substantially lower than the normal dyeing temperature of 265° F. for PET. This copolyester is a great advantage over PET.

Nevertheless, there continues to be a need for improved copolyester fibers that possess enhanced, superior dyeing properties, maintain the stability of the incorporated dye, and possess suitable characteristics of tenacity, shrinkage, dyeability and dye retention.

SUMMARY OF THE INVENTION

It is therefore an object of the present invention to provide a copolyester fiber and a method of producing a copolyester fiber that has improved dyeability and dye retention properties, while maintaining other physical properties of tenacity and shrinkage. The resulting copolyester fiber may be dyed to a desired intensity level using atmospheric, low temperature conditions to achieve a comparable or greater dye intensity to that achieved from a standard copolyester fiber (of PET and adipic acid, with a small amount of pentaerythritol). The present invention surprisingly enhances the dyeability and dye permanence beyond that of the copolyester of PET, pentaerythritol, and adipic acid; maintains the physical properties; and enables the use of mild dyeing conditions. Thus, the present invention provides a unique balance of physical properties with improved dyeability and dye permanence compared with PET, or with the copolyester of PET and adipic acid (with a small amount of pentaerythritol).

The copolyester of the present invention is formed from a batch or continuous process of reacting TA or DMT and ethylene glycol in an esterification stage followed by a polycondensation stage. A mixture comprising about 2–4 mole percent and, more preferably, about 3½ mole percent of Dibasic Esters (DBEs), sold by E.I. du Pont Nemours and Co., and about 100–700 ppm of pentaerythritol is added to the reaction. The resulting copolymer is melt extruded into a fiber having increased dyeability and dye permanence, while maintaining good physical properties.

The improved copolyester fiber retains a useful range of physical properties, which lend themselves to use of the fibers in a variety of textile applications. In particular, the improved dyeability and dye permanence enables the deep-dye copolyester fibers to be integrated into various fabric blends, which include heat sensitive natural and synthetic fibers. The resulting fibers can be safely dyed at the lower temperatures required of the heat sensitive component, the deep dye copolyester fibers achieving a dye intensity level matching that of the other blended, non-copolyester fibers. The invention also provides a copolyester fiber, which dyes darker and with a substantial increase in dye permanence under more economical dyeing conditions than a standard PET fiber.

In the broadest sense, the present invention comprises: a) copolymer of: a) polyethylene terephthalate prepared from either terephthalic acid or its ester equivalent; b) at least two dicarboxylic acids, or their anhydride or ester equivalents; and c) pentaerythritol.

The foregoing and other objects, advantages and features of the invention, and the manner in which the same are accomplished, will become more readily apparent upon consideration of the following detailed description of the invention taken in conjunction with the examples, which illustrate exemplary embodiments.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings.

DETAILED DESCRIPTION OF THE PREFERRED EMBODIMENT

Figure 1:
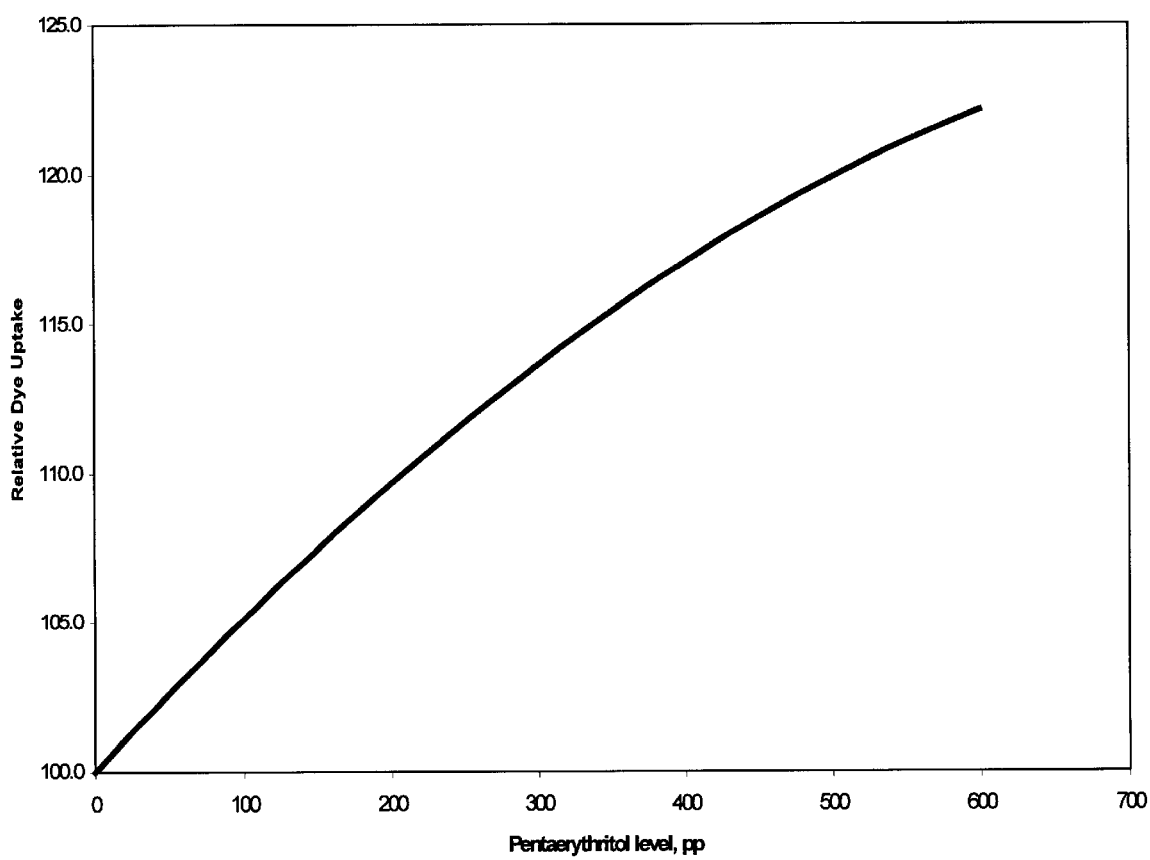
FIG. 1 is a graph setting forth the improved dyeing performance expressed in percent relative luminance of copolyester fibers of the present invention verses amount of pentaerythritol.

The term fiber as used herein means staple, filament, and tow.

The term dicarboxylic acid refers not only to the acid itself, but also includes the anhydride, and the ester equivalent. Consequently, a reference to two dicarboxylic acids, for example, includes two acids, an acid and an ester equivalent, an acid and an anhydride, or an ester equivalent and an anhydride.

The invention comprises forming an improved copolyester from PET and about 2–4 mole percent of a mixture of at least two dicarboxylic acids, and about 100–700 ppm pentaerytliritol. Commercially PET is formed from terephthalic acid (TA) or dimethyl terephthalate (DMT), and ethylene glycol (EG). If TA is reacted with EG the molar ratio is from 1.2:1 to 2.0:1 EG/TA, at a pressure of about 5 to about 85 psia, at a temperature of about 185 to 290° C. for about 1–5 hours for the esterification reaction. If DMT is reacted with EG, the molar ratio is from 1.8:1 to 2.2:1 EG/DMT, at a similar pressure, temperature, and time, but with a suitable catalyst. The second reaction (polycondensation) involves the polymerization of the monomer formed from esterification, at a pressure of from 0 to 40 mm Hg at a temperature of 205 to 305° C. for 1–4 hours using a suitable catalyst. These conditions are well known to those skilled in the art.

Suitable dicarboxylic acids useful in the present invention are: oxalic, malonic, succinic, glutaric, adipic, pimelic, suberic, azelaic, sebacic, maleic, fumaric, phthalic, isophthalic, hemimellitic, trimellitic, trimesic, and the anhydride or ester equivalents of any of these. A particularly preferred mixture is known as DBE (Dibasic Esters) from E.I. du Pont Nemours and consists of about 85 wt. % adipic acid ester (adipate), about 10 wt. % succinic acid ester (succinate), and about 5 wt. % glutaric acid ester (glutarate). A preferred amount of the mixture of dicarboxylic acids is 3–4 mol % based on the amount of the TA or its ester equivalent. A most preferred amount is 3½ mol % of the mixture. Employing less than about 2 mol % of the mixture does not significantly impact the dyeability of the resultant fibers compared to that of PET, while employing more than about 4 mol % detracts from the physical properties necessary for textile applications.

Using more than about 700 ppm does not seem to provide an additional increase in dyeability, and in fact too much pentaerytritol significantly reduces tenacity. A preferred range is 200 to 600 ppm, and a more preferred range is 500 to 600 ppm pentaeryliritol, based on the amount of the TA or its ester equivalent.

The copolyester may be manufactured using a batch process or a continuous process. The reaction proceeds through the well-known stages of esterification and polycondensation to form a copolyester. Either the batch or continuous process can be run in a manner such that the mixture of dicarboxylic acids (or their anhydride or ester equivalents) and/or pentaerythritol is loaded with the other raw materials at the beginning of the esterification process. On the other hand, the mixture of dicarboxylic acids (or their anhydride or ester equivalents) and/or pentaerytliritol may be loaded at the end of esterification, just before polycondensation. Running either process within the well-known conditions of temperature and pressure for a PET production, including the amounts and types of catalysts are suitable for the present invention also. Moreover, inclusion of well known additives such as colorants, pigments, blueing agents, delustrants, stabilizers, crystallization retarders, molecular weight control agents, optical brighteners, etc. are well within the scope of the skilled artisan.

General Conditions

The important physical properties for textile fibers of the present invention are tenacity, shrinkage, dyeability, and dye permanence. Tenacity is the breaking load in grams per denier (g/d), where 3–6 g/d is suitable. The testing was conducted under ASTM D-3822-96. Percent elongation is the amount a fiber stretches under a specified load. The testing was conducted under ASTM D-3822-96. Boiling Water Shrinkage (BWS) of the fiber in percent, is measured using the following equation:

$$BWS(\%) = [(L2-L1)/L1] \times 100$$

where, L1: Length of the yarn measured under a load of 0.1 grams per denier (g/d); and L2: Length of the yarn measured after treating the yarn in boiling water for 30 minutes under a load of 2 milligrams per denier (mg/d), naturally drying it for 24 hours under no load, and then applying a load of 0.1 g/d to the dried yarn; where less than 15% BWS is suitable.

Dyeability is measured in terms of luminance (L*) using a Hunter Spectophotometer having a scale from 0 to 100, where the lower the number the deeper and darker the dyeing. Hoselegs were knitted from the textured yarn and dyed. Various disperse dyestuffs were used to cover a range of classes, i.e. low energy dyes that have fast dye rates and can be used at lower dye temperatures, medium energy dyes, and high energy dyes that take longer to dye but have excellent fastness characteristics on standard unmodified polyester. Suitable dyestuffs include Dianix® disperse dyes available from DyStar. A typical dyeing procedure is:

1.) Prescour in a solution of detergent (Pentex AS 0.5%) at 100–120° F. for 10 minutes;

2.) Drop the wash solution and refill with a solution of:

| | |
|---|---|
| Acetic Acid | 0.5% |
| Levelling agent (Levegal ® DLP-U from Bayer Corporation) | 2.0% | and circulate for 5 minutes at 140° F.;

3.) Add disperse dye at the level required for the shade, circulate for 5–10 minutes;

4.) Raise temperature at a rate depending on the shade formulation;

5.) After dyeing is complete, cool at 40° F./min. to 150° F. and rinse. Typical dye concentrations and heating cycles for the inventive copolyesters are shown in the table below.

|  | Light Shades | Medium Shades | Dark Shades |
|---|---|---|---|
| Dyestuff, % wt. of fiber | 0.01–0.75 | 0.75–1.50 | 1.50–4.0 |
| Cycle 1 | | | |
| Temp. range, °F. | 140–190 | 140–190 | 140–210 |
| Heating rate, °F./min | 1.5 | 2.0 | 2.5 |
| Hold time, min. | 5 | 5 | 5 |
| Cycle 2 | | | |
| Temp. range, °F. | 190–220 | 190–220 | 210–220 |
| Heating rate, °F./min | 2.5 | 3.0 | 3.5 |
| Hold time, min. | 15 | 45 | 60 |

EXAMPLE 1

A copolymer was prepared from ethylene glycol and DMT at a molar ratio of from about 1.8–2.2 (EG/DMT) with 3½ mole percent DBE and 600 ppm pentaeryliritol both based on the amount of DMT. The copolymer was melt extruded into a POY filament using conventional process conditions well know to those skilled in the art. The standard or control is a conventional PET POY filament commercially available as BPI 10366 (KoSa). The control filament is produced under the same conditions as filament of the present invention, but without the enhancements of the DBE and pentaerythritol additives. Both POY's were textured under the same conditions.

The dyeing conditions set forth is atmospheric dyeing at dyeing temperatures ranging from 200° F. to 265° F. for 45 minutes using Dianix® Blue 27 dyestuff (1% by wt.). Comparison of the luminance values set forth in Table 1, demonstrates that the filament of the present invention will dye darker than conventional PET polyester at any given temperature. Further, there is only a small improvement in luminance (the dye uptake) from the lowest to the highest dye temperature. The percent relative luminance is the ratio of the luminance of the control to the luminance of the copolyester, multiplied by 100, to show the improvement.

TABLE 1

| | Luminance values Dyeing Temperature | | | | |
|---|---|---|---|---|---|
| Polyester type | 200° F. | 210° F. | 220° F. | 245° F. | 265° F. |
| Control | 53.5 | 52.5 | 51 | 46 | 42 |
| Copolyester | 38.5 | 37.5 | 37 | 36 | 36.5 |
| % Rel. L* | 139 | 140 | 138 | 128 | 115 |

Comparing the percent relative luminance of the present invention to Sample 3 of Table 3 in either U.S. Pat. Nos. 5,135,697 or 5,272,246 (the closest prior art with 3.1 wt. % of adipic acid and 580 ppm pentaerythritol) at the same atmospheric dying temperature (210° F.), shows a significant increase in dye up-take (140% vs. 107%). Furthermore, the physical properties of the present invention of tensile, shrinkage and dye retention are maintained, as illustrated by the following example.

EXAMPLE 2

The Control and Copolyester fibers of Example 1 were tested for tenacity, elongation and BWS and the results are set forth in Table 2. As seen in the table, the tensile properties fall well within the range of commercially useful values.

TABLE 2

| Properties of Textured Fiber | | | | |
|---|---|---|---|---|
| Polyester Type | Denier | Tenacity (g/d) | Elongation (%) | BWS (%) |
| Control | 150 | 4.3 | 24 | 10.5 |
| Copolyester | 150 | 3.1 | 34 | 8.7 |

EXAMPLE 3

An additional goal of the present invention is to provide a copolyester fiber with dye permanence that resists subsequent crocking or bleeding of the dye. Enhanced dye uptake is frequently associated with poor dye permanence, resulting in unwanted dye crocking and bleeding. The present invention has been found to have good dye permanence and resist dye crocking and bleeding.

Set forth in Table 3, is a comparison of high, medium, and low energy disperse dyes, for the Copolyester and Control fibers from Example 1. The copolyester was dyed at lower temperatures than the control. Dye permanence was rated according to AATCC-American Association of Textile Chemists and Colorists procedures, for the 2A Wash (Method 61); Xenon Light-20 hours (Method 16E); Sublimation (Method 117); Wet and Dry Crock (Method 8); Solvent Bleed (Method 132); and Cotton Stain (Method 163), where 5 indicates no bleeding or staining or reduction in dye color, under any of the Methods, while 1 indicates extensive bleeding, staining, fading or reduction in dye color. The copolyester fiber compares favorably to the higher temperature dye Control fiber.

TABLE 3

| Colorfastness Performance on Selected Dyes | | | | | | | |
|---|---|---|---|---|---|---|---|
| | Dyeing Temp. (° F.) | 2A Wash | Light (20 hrs.) | Sublimation 182° C. (360° C.) | Wet Crock | Dry Crock | Solvent Bleed | Cotton Stain |
| Low Energy Disperse Dye, (Dianix ® Blue FBL-E, 1.0% by wt.) | | | | | | | |
| Fiber | | | | | | | |
| Copolyester | 200 | 4 | 5– | 4+ | 5 | 5 | 5 | 3 |
| Copolyester | 220 | 4–5 | 5– | 4+ | 5 | 5 | 5 | 3–4 |
| Control | 265 | 5– | 5 | 5– | 5 | 5 | 5 | 4 |

TABLE 3-continued

Colorfastness Performance on Selected Dyes

| | Dyeing Temp. (° F.) | 2A Wash | Light (20 hrs.) | Sublimation 182° C. (360° C.) | Wet Crock | Dry Crock | Solvent Bleed | Cotton Stain |
|---|---|---|---|---|---|---|---|---|
| Medium Energy Disperse Dye, (Dianix ® Blue SB-G, 0.9% by wt.) | | | | | | | | |
| Fiber | | | | | | | | |
| Copolyester | 220 | 4 | 4+ | 5 | 5 | 5 | 5 | 2 |
| Control | 265 | 4 | 5− | 5 | 5 | 5 | 5− | 3 |
| High Energy Disperse Dye, (Dianix ® Navy S2-G 200, 1.8% by wt.) | | | | | | | | |
| Yarn | | | | | | | | |
| Copolyester | 220 | 5− | 5− | 5 | 5 | 5− | 4 | 5− |
| Control | 265 | 5− | 5 | 5 | 5 | 5 | 5− | 5 |

Lower temperature dyeing conditions reduces the cost associated with the production of a dyed fiber.

EXAMPLE 4

A series of polymers were made with a constant level of DBE (3.5 mole %) with 0, 200, 400 and 600 ppm pentaeryritol, both based on the amount of DMT. These were spun at a spinning speed of about 10,000 fpm and at a spinning temperature of about 270° C. The POY was textured under normal conditions to give a textured yarn elongation in the range 20 to 35%. The textured yam was knitted into hoselegs and dyed (Dianix Blue 27, 1% by wt.) under atmospheric pressure conditions. The luminance of the hoselegs was measured. FIG. 1 shows the relative dye uptake as a finction of pentaerydiritol level. As the amount of pentaeryftiritol was increased, the relative luminance (the increase in luminance over that of PET defined as 100) was increased.

Thus, it is apparent that there has been provided in accordance with the invention, a copolyester and a method of preparing the copolyester incorporating two or more dicarboxylic acids (and or their anhydride or ester equivalents) and pentaerythritol that fully satisfies the objects, aims and advantages as set forth above. While the invention has been described in conjunction with specific embodiments thereof, it is evident fhat many alternatives, modifications and variations will be apparent to those skilled in the art in light of the foregoing description. Accordingly, it is intended to embrace all such alternatives, modifications and variations that fall within the sphere and scope of the invention.

What is claimed is:

1. A copolyester fiber which has a superior dye uptake and dye permanence, the fiber comprising: a copolymer of: a) polyethylene terephthalate prepared from terephthalic acid or its ester equivalent; b) at least two dicarboxylic acids, or their anhydride or ester equivalents; excluding terephthalic acid and its ester equivalent, and c) pentaerythritol.

2. The copolyester fiber of claim 1, wherein said at least two dicarboxylic acids, or their anhydride or ester equivalents is added in an amount of about 2–4 mole percent based on the amount of said terephthalic acid and its ester equivalent.

3. The copolyester fiber of claim 2, wherein said pentaerythritol is added in the amount from about 100 to about 700 ppm based on the amount of said terephthalic acid and its ester equivalent.

4. The copolyester fiber of claim 2, wherein said at least two dicarboxylic acids, or their anhydride or ester equivalents are selected from the class of oxalic, malonic, succinic, glutaric, adipic, pimelic, suberic, azelaic, sebacic, maleic, fumaric, phthalic, isophthalic, hemimellitic, trimellitic, and trimesic acids.

5. A copolyester comprising: a copolymer of: a) polyethylene terephthalate prepared from either terephthalic acid or its ester equivalent; b) at least two dicarboxylic acids, or their anhydride or ester equivalents excluding terephthalic acid and its ester equivalent; and c) pentaerythritol.

6. The copolyester of claim 5, wherein said at least two dicarboxylic acids is added in an amount of about 2–4 mole percent based on the amount of said terephthalic acid and its ester equivalent.

7. The copolyester of claim 6, wherein said pentaerytritol is added in the amount from about 100 to about 700 ppm based on the amount of said terephthalic acid and its ester equivalent.

8. The copolyester of claim 6, wherein said at least two dicarboxylic acids, or their anhydride or ester equivalents are selected from the class of oxalic, malonic, succinic, glutaric, adipic, pimelic, suberic, azelaic, sebacic, maleic, fumaric, phthalic, isophthalic, hemimellitic, trimellitic, and trimesic acids.

9. A process of producing a copolyester, comprising: in reacting terephthalic acid or its ester equivalent with ethylene glycol, and adding at least two dicarboxylic acids, or their anhydride or ester equivalents excluding terephthalic acid and its ester equivalent, and adding pentaerythritol.

10. The process of claim 9, wherein said step of reacting includes esterification and polycondensation reactions.

11. The process of claim 10, wherein said steps of adding is before said esterification reaction.

12. The process of claim 10, wherein said steps of adding is after said esterification reaction.

13. The process of claim 9, wherein said at least two dicarboxylic acids or their anhydride or ester equivalents is added in an amount of about 2–4 mole percent based on the amount of said terephthalic acid and its ester equivalent.

14. The process of claim 13, wherein said pentaerythritol is added in the amount from about 100 to about 700 ppm based on the amount of said terephthalic acid and its ester equivalent.

15. The process of claim 13, wherein said at least two dicarboxylic acids, or their anhydride or ester equivalents are selected from the class of oxalic, malonic, succinic, glutaric, adipic, pimelic, suberic, azelaic, sebacic, maleic, fumaric, phthalic, isophthalic, hemimellitic, trimellitic, and trimesic acids.

16. The process of making a textile fiber, comprising: a) making a copolyester by reacting terephthalic acid or dimethyl terephthalate with ethylene glycol, and adding at least two dicarboxylic acids, or their anhydride or ester equivalents, excluding terephthalic acid and its ester equivalent, and adding pentaerythritol; b) melt extruding said copolyester into a fiber; and c) drawing and crimping said fiber to obtain physical properties sufficient for textile applications.

17. The process of claim 16, wherein said at least two dicarboxylic acids or their anhydride or ester equivalents are added in an amount of about 2–4 mole percent based on the amount of said terephthalic acid and its ester equivalent.

18. The process of claim 17, wherein said pentaerythritol is added in the amount from about 100 to about 700 ppm based on the amount of said terephthalic acid and its ester equivalent.

19. The process of claim 16, wherein said at least two dicarboxylic acids, or their anhydride or ester equivalents are selected from the class of oxalic, malonic, succinic, glutaric, adipic, pimelic, suberic, azelaic, sebacic, maleic, fumaric, phthalic, isophthalic, hemimellitic, trimellitic, and trimesic acids.

* * * * *